United States Patent [19]

Kido

[11] Patent Number: 4,736,905
[45] Date of Patent: Apr. 12, 1988

[54] AUTOMATIC REVERSE MECHANISM FOR TAPE RECORDER

[75] Inventor: Kunio Kido, Wako, Japan

[73] Assignee: Tanashin Denki Co., Ltd., Tokyo, Japan

[21] Appl. No.: 42,726

[22] Filed: Apr. 27, 1987

[30] Foreign Application Priority Data

Nov. 21, 1986 [JP] Japan .................... 61-179413[U]

[51] Int. Cl.$^4$ ............... B65H 18/08; G11B 15/32; F16H 35/00
[52] U.S. Cl. .......................... 242/201; 360/96.3; 74/380
[58] Field of Search ........... 242/54 R, 179, 197–201, 242/204, 206, 67.1 R, 67.2, 67.3 R; 360/90, 93, 96, 96.3; 74/353, 354, 380, 384

[56] References Cited

U.S. PATENT DOCUMENTS 4,680,659  7/1987  Imai ..................... 242/201 X

*Primary Examiner*—David Werner
*Attorney, Agent, or Firm*—Wegner & Bretschneider

[57] ABSTRACT

An automatic reverse mechanism for a tape recorder includes capstans, pinch rollers and reel shafts arranged respectively on both sides of an associated magnetic head. The mechanism also includes rotation transmitting members arranged symmetrically relative to the magnetic head, eccentric circular cam surfaces provided respectively about the shafts of the rotation transmitting members, and cam members having outwardly-arcuate cam surfaces and provided respectively on the rotation transmitting members with an interval between the cam members and the eccentric circular cam surfaces. The outwardly-arcuate cam surfaces are located on the sides opposite to the peripheral surfaces of the corresponding eccentric circular cam surfaces. The mechanism also includes cam followers arranged symmetrically relative to the magnetic head so as to receive the rotation of the corresponding reel shafts via corresponding friction mechanisms and a pinch roller changeover mechanism.

4 Claims, 5 Drawing Sheets

AUTOMATIC REVERSE MECHANISM FOR TAPE RECORDER

BACKGROUND OF THE INVENTION (1) Field of the Invention

This invention relates to an automatic reverse mechanism for a tape recorder. When the rotation of reel shafts is stopped, the automatic reverse mechanism detects it and switches the actuated pinch roller from a left-hand pinch roller to a right-hand pinch roller and vice versa.

(2) Description of the Prior Art

As automatic reverse mechanisms for tape recorders, there have heretofore been known those detecting electrically each end of a magnetic tape and actuating an electromagnetic plunger so as to switch the actuated pinch roller from a left-hand pinch roller to a right-hand pinch roller and vice versa; and those detecting mechanically a tensile force indicative of each end of a magnetic tape so as to switch the actuate pinch roller from a left-hand pinch roller to a right-hand pinch roller and vice versa by making use of the rotary power of a flywheel or the like.

However, the former automatic reverse mechanisms are equipped respectively with electromagnetic plungers and hence have complex structures. They are accordingly disadvantageous for dimensional reduction. The latter automatic reverse mechanisms generally have such a structure that a pin is provided upright on a flywheel and a pinch roller changeover mechanism is triggered by the pin. This structure is however accompanied by a potential danger that the balance of the flywheel would be impaired. It also involves another potential danger that the mechanism could malfunction as a result of detection of a tentative increase of the tape tension at the time of start.

FIGS. 4 and 5 illustrate an automatic reverse mechanism for a tape recorder, which has solved such problems. An application for patent has already been filed thereon by the present assignee (Japanese patent application No. 192835/1983).

FIG. 4 illustrates the automatic reverse mechanism with a right-hand reel shaft 1a being in rotation, while FIG. 5 illustrates the same automatic reverse mechanism in the course of its change from the state shown in FIG. 4 to another state in which a left-hand reel shaft 1b is rotated.

Referring first of all to FIG. 4, capstans 3a,3b, pinch rollers 4a,4b and the above-mentioned reel shafts 1a,1b are disposed respectively in a symmetrical relation. Small diameter gears 5a,5b and flywheels 6a,6b are respectively secured on the capstans 3a,3b. There are also provided turnable members 7a,7b turnably about their corresponding capstans 3a,3b. Rotation transmitting units composed in combination of large diameter gears 8a,8b and small diameter gears 9a,9b respectively are supported on one ends of the turnable members 7a,7b via shafts 10a,10b. Eccentric circular cam surfaces 11a,11b are formed respectively about the shafts 10a,10b. In addition, pushing projections 12a,12b are also provided integrally with the shafts 10a,10b at positions where the eccentric cam surfaces 11a,11b have the maximum radii. On the other hand, the other ends of the turnable members 7a,7b terminate in bent end portions 13a,13b.

The pinch rollers 4a,4b are supported on brackets 15a,15b, which are pivotal about pivots 14a,14b respectively, so that the pinch rollers 4a,4b can be releasably brought into contact with their corresponding capstans 3a,3b. Bent edge portions 16a,16b are also provided on the respective brackets 15a,15b.

A changeover bar 17, which is slidable horizontally as viewed in FIG. 4, is provided with lugs 18a,18b;-19a,19b in such a way that the bent end portions 13a,13b of the respective turnable members 7a,7b are interposed between the corresponding lugs 18a,19a and 18b,19b. The changeover bar 17 also defines openings 20a,20b which receive the bent edge portions 16a,16b of the brackets 15a,15b respectively. Tilted edges 21a,21b are formed by parts of the openings 20a,20b. When the changeover bar 17 moves rightwards, the left-hand tilted edge 21b is caused to slide on the bent edge portion 16b of the left-hand bracket 15b as illustrated in FIG. 4, whereby the left-hand pinch roller 4b is separated from its corresponding capstan 3b. When the changeover bar 17 moves leftwards, the right-hand tilted edge 21a is caused to slide on the bent edge portion 16a of the right-hand bracket 15a, whereby the right-hand pinch roller 4a is separated from its corresponding capstan 3a. However, the respective brackets 15a,15b are biased by their corresponding unillustrated springs in such directions that the respective pinch rollers 4a,4b are pressed against their corresponding capstans 3a,3b.

Further, a two-state switch lever 25 which is pivotal in a two-state fashion between paired stopper pins 23 and 24 by a toggle spring 22 is provided in the vicinity of one end of the changeover bar 17. These two-state switch lever 25 and toggle spring 22 constitute a pinch roller changeover mechanism together with the changeover bar 17. When the changeover bar 17 has moved, for example, in the leftward direction and the two-state switch lever 25 has been turned to a point beyond the neutral point, the changeover bar 17 is moved further in the leftward direction owing to the turning force of the two-state switch lever 25, whereby the right-hand pinch roller 4a is separated from the associated capstan 3a.

Of the large diameter gears 8a,8b and small diameter gears 9a,9b which in combination constitute the rotation transmitting units, the large diameter gears 8a,8b are maintained in meshing engagement with the small diameter gears 5a,5b provided as unitary members with the capstans 3a,3b respectively, while the small diameter gears 9a,9b are selectively engageable with large diameter gears 26a,26b provided coaxially with the reel shafts 1a,1b. By the way, the meshing engagement between the gears 9a and 26a and that between the gears 9b and 26b are controlled respectively by the turning movements of the turnable members 7a,7b. Both turnable members 7a,7b are however biased by their corresponding tension springs 27a,27b in such directions that the gears 9a,9b are brought into meshing engagement with their corresponding gears 26a,26b. On the other hand, the turning movements of the turnable members 7a,7b are controlled by the horizontal movement of the changeover bar 17. The turnable member 7a,7b and changeover bar 17 are linked together in such a way that while one of the gears (for example, the right-hand gear 9a) is maintained in meshing engagement with the gear 26a, the other gear 9b is maintained out of engagement from the gear 26b.

Mounted on the reel shafts 1a,1b are rotary members 28a,28b which rotate together with their corresponding reel shafts 1a,1b. Pin-like pushing and urging portions 29a,29b are fixedly provided on the rotary members 28a,28b respectively. Friction mechanisms (not shown) are interposed between the reel shafts 1a,1b and the rotary members 28a,28b and between the reel shafts 1a,1b and the large diameter gears 26a,26b respectively. For example, the large diameter gear 26a can still be allowed to rotate even after the rotation of the reel shaft 1a has been stopped. In this case, the corresponding friction mechanism undergoes slipping. The friction mechanism described in copending U.S. patent application Ser. No. 927,184 filed on Nov. 5, 1986 and assigned commonly to the present assignee, which is incorporated herein by way of reference, may be suitably used as the above friction mechanisms. Designated at numeral 30 is a fixing plate, on which cam followers 31a,31b and auxiliary holding members 32a,32b are pivotally supported.

The cam followers 31a,31b have contact portions 33a,33b at locations farthest from their fulcrums, pressure receiving portions 34a,34b located respectively on the orbits of revolutions of the pushing and urging portions 29a,29b, and elastic fingers 35a,35b in the vicinity of the fulcrums. On the other hand, the auxiliary holding members 32a,32b have a substantially L-like configuration. Lower arms 36a,36b are located outside the shafts 10a,10b, while upper arms 37a,37b are positioned in opposition to the elastic fingers 35a,35b of the cam followers 31a,31b.

The operation will next be described. In FIG. 4, the right-hand pinch roller 4a is in contact under pressure with the capstan 3a and the rotation of the capstan 3a, the direction of which is indicated by an arrow, is being transmitted via the gears 5a,8a,9a,26a and the unillustrated friction mechanism to the right-hand reel shaft 1a. At this time, the rotary power of the reel shaft 1a is being transmitted to the cam follower 31a by way of the pushing and urging portion 29a, whereby the contact portion 33a of the cam follower 31a is maintained in sliding contact with the cam surface 11a. So long as the contact portion 33a is maintained in sliding contact with the cam surface 11a in the above-described manner, the contact portions 33a is maintained out of contact with the pushing projection 12a.

Let's now assume that either playback or recording operation is being performed while a magnetic tape (not shown) is being taken up on the right-hand reel shaft 1a. Since the left-hand reel shaft 1b serves as a tape-releasing side at this time, the pushing and urging portion 29b does not push the pressure-receiving portion 34b of the cam follower 31b. In this state, the left-hand rotation transmitting unit (gears 8b,9b) has however been separated from the large diameter gear 26b to a non-engagement position relative to the reel shaft 1b. Accordingly, the lower arm 36b of the auxiliary holding member 32b is being pushed by the shaft 10b. As a result, the upper arm 37b of the auxiliary holding member 32b is pressing the elastic finger 35b of the cam follower 31b so that the auxiliary holding member 32b in place of the pushing and urging portion 29b maintains the contact portion 33b of the cam follower 31b in sliding contact with the cam surface 11b.

When the tape has been fully wound up on the right-hand reel (not shown), slipping is developed in the friction mechanism interposed between the large diameter gear 26a and the reel shaft 1a so that the reel shaft 1a stops. The contact portion 33a which has been kept in sliding contact with the cam surface 11a is hence separated from the cam surface 11a at a location where the contact portion 33a is closest to the shaft 10a and as illustrated in FIG. 5, the pushing and urging portion 12a is brought into contact with the contact portion 33a. Since the fulcrum of the cam follower 31a does not move, the rotation transmitting member, namely, the turnable member 7a is hence caused to turn against the force of the spring 27a so that the gear 9a is separated from the large diameter gear 26a. As a result, the transmission of the rotary power to the large diameter gear 26a is stopped.

On the other hand, a turning movement of the turnable member 7a causes the bent end portion 13a thereof to press the lug 19a of the changeover bar 17 from the right as shown in FIG. 5, thereby moving the changeover bar 17 leftwards. In response to the leftward movement of the changeover bar 17, the two-state switch lever 25 is caused to turn clockwise while compressing the toggle spring 22. As soon as the toggle spring 22 is moved beyond the neutral point, the spring force of the spring 22 acts in the direction that the two-state switch lever 25 is turned further in the clockwise direction. Hence, the changeover bar 17 is caused to move rapidly in the leftward direction.

Here, the left-hand inclined edge 21b of the changeover bar 17 releases the bracket 15b. In contrast, the right-hand inclined edge 21a causes the bracket 15a to turn in a direction opposite to its biased direction. As a result, the left-hand pinch roller 4b is brought into contact under pressure with the capstan 3b while the right-hand pinch roller 4a is separated from the capstan 3a. Further, the left-hand turnable member 7b is pulled by the spring 27b and is hence caused to turn clockwise, whereby the small diameter gear 9b is brought into meshing engagement with the large diameter gear 26b in the same rotation transmitting unit. In the above state, opposite to the state shown in FIG. 4, the left-hand reel shaft 1b is caused to rotate in the winding direction and a playback or recording operation is performed while the tape is being wound up on the left-hand reel.

According to a structure such as that described above, accessory parts such as electromagnetic plungers are not required so that the size reduction of an automatic reverse mechanism is facilitated. The above automatic reverse mechanism has such additional advantages that it does not impair the balanced rotation of the flywheels and owing to the actuation of the pinch roller changeover mechanism upon detection of each stop of the reel shafts, it is free from malfunction even if the tape tension is increased temporarily at start.

In the above-described automatic reverse mechanism, the rotary powers of the reel shafts 1a,1b are however transmitted to their corresponding cam followers 31a,31b by way of the unillustrated friction mechanisms, rotary members 28a,28b and pushing and urging portions 29a,29b. Accordingly, the rotary powers are lost significantly during their transmission from the reel shafts 1a,1b to the cam followers 31a,31b. In order to reduce their losses in the course of their transmission, the friction forces between the reel shafts 1a,1b and the corresponding rotary members 28a,28b have been set at a high level. Since the friction forces act as a back tension at the tape-feeding side (releasing side), they have created a problem that a greater difference arises between the running speed of a magnetic tape at the start of its winding and the running speed of the magnetic tape at the end of its winding due to the change in the diameter of the tape taken up on the tape winding side.

The above automatic reverse mechanism involves another problem that it requires many parts, since the rotary members 28a,28b are interposed between their corresponding reel shafts 1a,1b and cam followers 31a,31b, and the auxiliary holding members 32a,32b are provided as parts discrete from the cam followers 31a,31b in order to maintain the contact portion 33a or 33b of the cam follower 31a or 31b on the feeding side during takeup of a magnetic tape (i.e., the cam follower 31b in FIG. 4) in contact with the its corresponding cam surface 11a or 11b.

SUMMARY OF THE INVENTION

An object of this invention is to provide an automatic reverse mechanism for a tape recorder, in which the back tension to be applied to a magnetic tape can be lowered and the running speed of the magnetic tape can hence been stabilized, and cam followers are each provided with a function to cut off the transmission of a rotary power to the reel shaft on the tape-feeding side.

In one aspect of this invention, there is provided an automatic reverse mechanism for a tape recorder, in which capstans, pinch rollers and reel shafts are arranged respectively on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a cassette inserted in the tape recorder to run toward the rotating reel shaft, and when the magnetic tape has been fully wound up on the rotating reel shaft, the running direction of the magnetic tape is automatically changed over, comprising:

rotation transmitting members arranged symmetrically relative to the magetic head, said rotation transmitting members being normally rotated about their corresponding shafts under rotary powers of the corresponding capstans so as to transmit the rotary powers to the corresponding reel shafts via corresponding friction mechanisms;

eccentric circular cam surfaces provided respectively about the shafts of the rotation transmitting members;

cam members having outwardly-arcuate cam surfaces and provided respectively on the rotation transmitting members with an interval between the cam members and the eccentric circular cam surfaces, said outwardly-arcuate cam surfaces being located on the sides opposite to the peripheral surfaces of the corresponding eccentric circular cam surfaces;

cam followers arranged symmetrically relative to the magnetic head so as to receive the rotation of the corresponding reel shafts via corresponding friction mechanisms; and a pinch roller changeover mechanism including turnable members provided symmetrically relative to the magnetic head and supporting the shafts of the corresponding rotation transmitting members thereon, and when one of the rotation transmitting members moves to its non-engagement position relative to its corresponding reel shaft, said pinch roller changeover mechanism changing over the on/off state of the respective pinch rollers relative to their corresponding capstans in response to the movement of the rotation transmitting member; and each of said cam followers having a sliding portion slidable selectively against either the peripheral surface of the corresponding eccentric circular cam or the outwardly-arcuate cam surface of the corresponding cam member, an engageable portion formed at a position opposite to the sliding portion, and an arm portion engageable with one end of the corresponding turnable member; while the corresponding reel shaft is in rotation, said sliding portion being maintained in sliding contact with the peripheral surface of the corresponding eccentric circular cam so as to maintain the sliding portion apart from the outwardly-arcuate cam surface of the corresponding cam member; when the corresponding reel shaft has stopped and the sliding portion has come to the maximum essentric position of the corresponding eccentric circular cam, the sliding portion being brought into sliding contact with the outwardly-arcuate cam surface of the corresponding cam member and the engageable portion being stopped, whereby the corresponding rotation transmitting member is moved to a non-engagement position relative to the associated reel shaft; and after the rotation transmitting member has moved to the non-engagement position relative to the corresponding reel shaft, said arm portion being brought into engagement with the one end of the corresponding turnable member so that the sliding member is maintained in its sliding state against the peripheral surface of the eccentric circular cam. The cam members are preferably crescentic cams.

In the automatic reverse mechanism of this invention, the rotation of each reel shaft is transmitted to its corresponding cam follower via its corresponding friction mechanism only. The loss of the rotary power in the course of its transmission is therefore very little. It is thus possible to set the friction force between the reel shaft and cam follower at a small level so that the back tension applied to the magnetic tape is reduced correspondingly. As a result, it is feasible to reduce the difference in the running speed of the magnetic tape between the start of its winding and the end of its winding due to the change in the diameter of the magnetic tape wound at the tape winding side, whereby the running of the magnetic tape is stabilized.

The sliding portion of each cam follower is maintained in a state of sliding contact with the peripheral surface of the corresponding eccentric circular cam by the engagement between the arm portion of the corresponding cam follower and the upper end of the associated turnable member. As a consequence, the transmission of the rotary power from the capstan on the winding side to the corresponding reel is not cut off while the reel shaft is in rotation so that a function similar to that achieved by an auxiliary holding member in the conventional automatic reverse mechanism is achieved. Therefore, the rotary member in the rotary power transmission route from each reel shaft to its corresponding cam follower has been rendered unnecessary. The auxiliary holding member has also been obviated. The number of parts has hence been reduced considerably.

BRIEF DESCRIPTION OF THE DRAWINGS

The above and other objects, features and advantages of the present invention will become apparent from the following description and appended claims, taken in conjunction with the accompanying drawings, in which:

DETAILED DESCRIPTION OF THE INVENTION AND PREFERRED EMBODIMENTS

Figure 1:
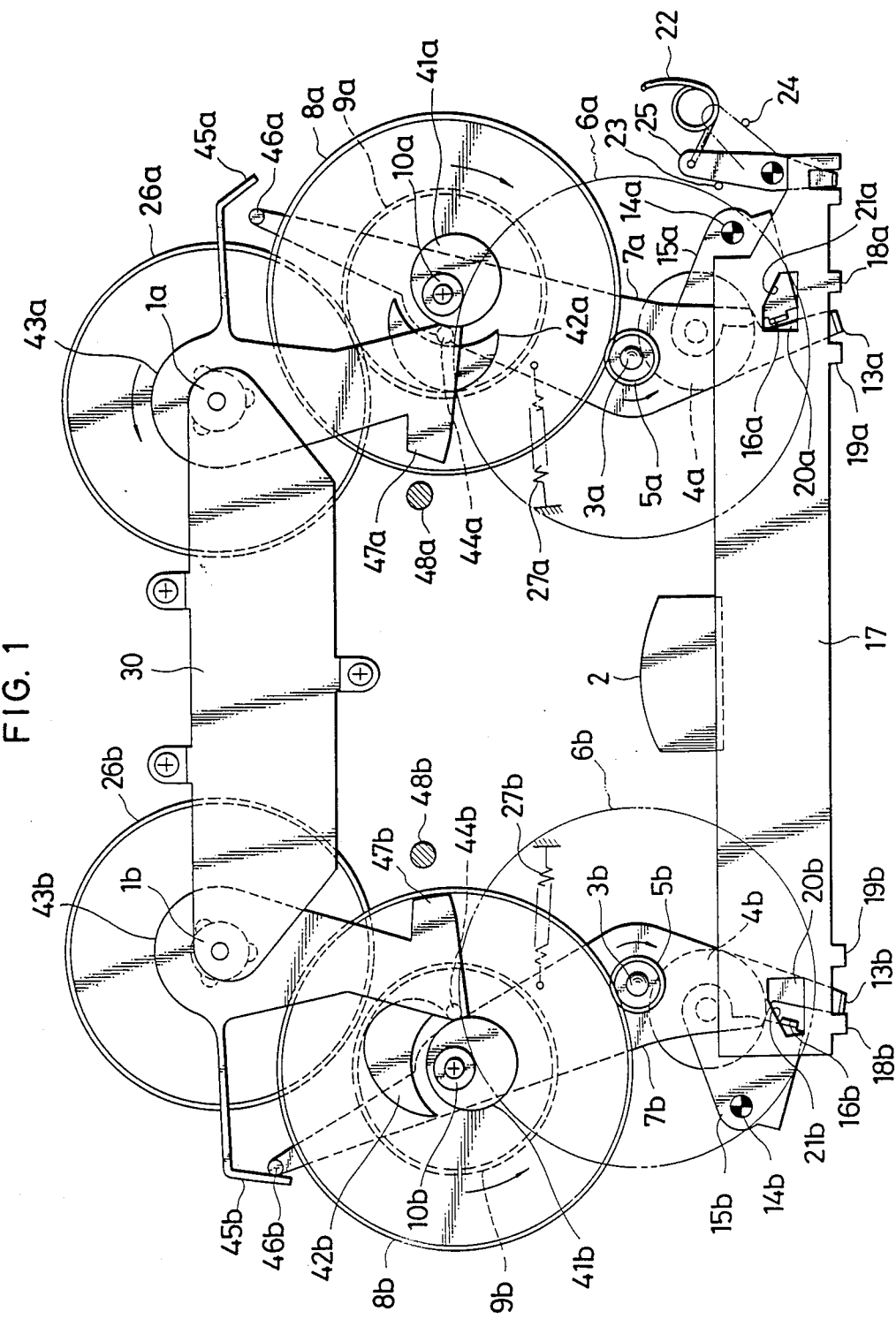
FIG. 1 is a schematic top plan view of an automatic reverse mechanism according to one embodiment of this invention, which is suitable for use in a tape recorder.
Figure 2:
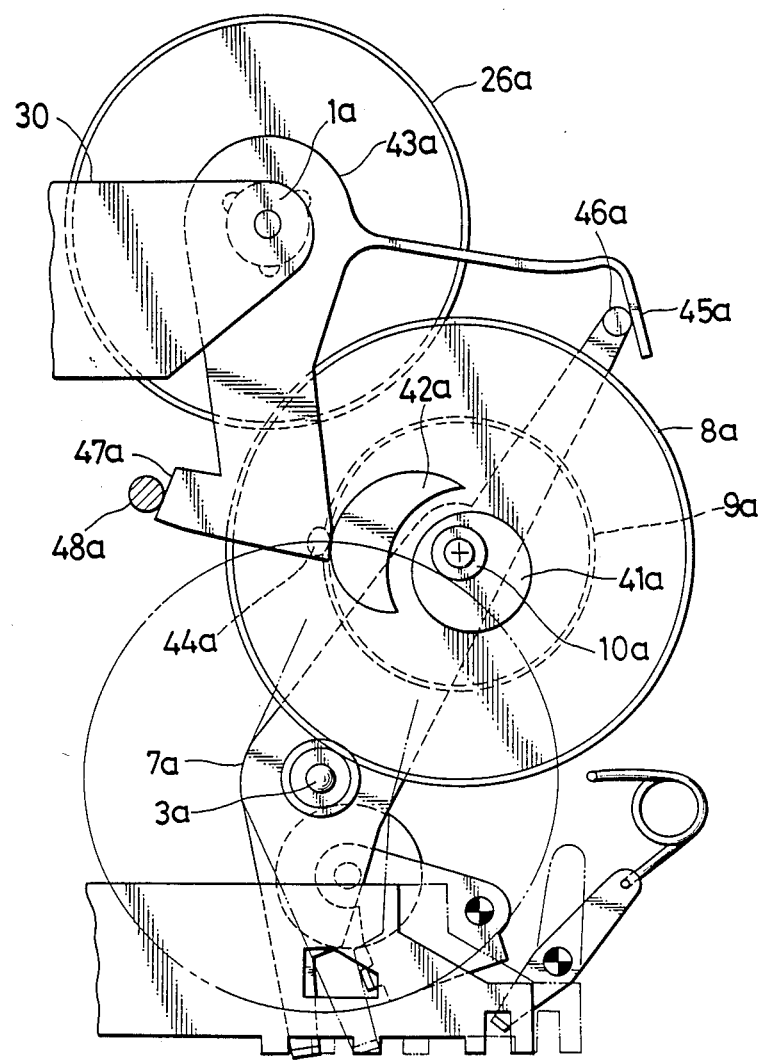
FIG. 2 is a fragmentary schematic top plan view of the automatic reverse mechanism of FIG. 1, in which the mechanism is in a position different from its position in FIG. 1.

FIG. 1 illustrates the overall structure of the automatic reverse mechanism according to the first embodiment of this invention, which is suitable for use in a tape recorder. The right-hand reel shaft 1a is in rotation in FIG. 1. FIG. 2 shows the same automatic reverse mechanism, which is in the course of a changeover from the state shown in FIG. 1 to a state in which the left-hand reel shaft 1b is rotated. In FIGS. 1 and 2, elements of structure which are identical in function to their corresponding elements of structure in FIGS. 4 and 5 are identified by like reference numerals.

Figure 4:
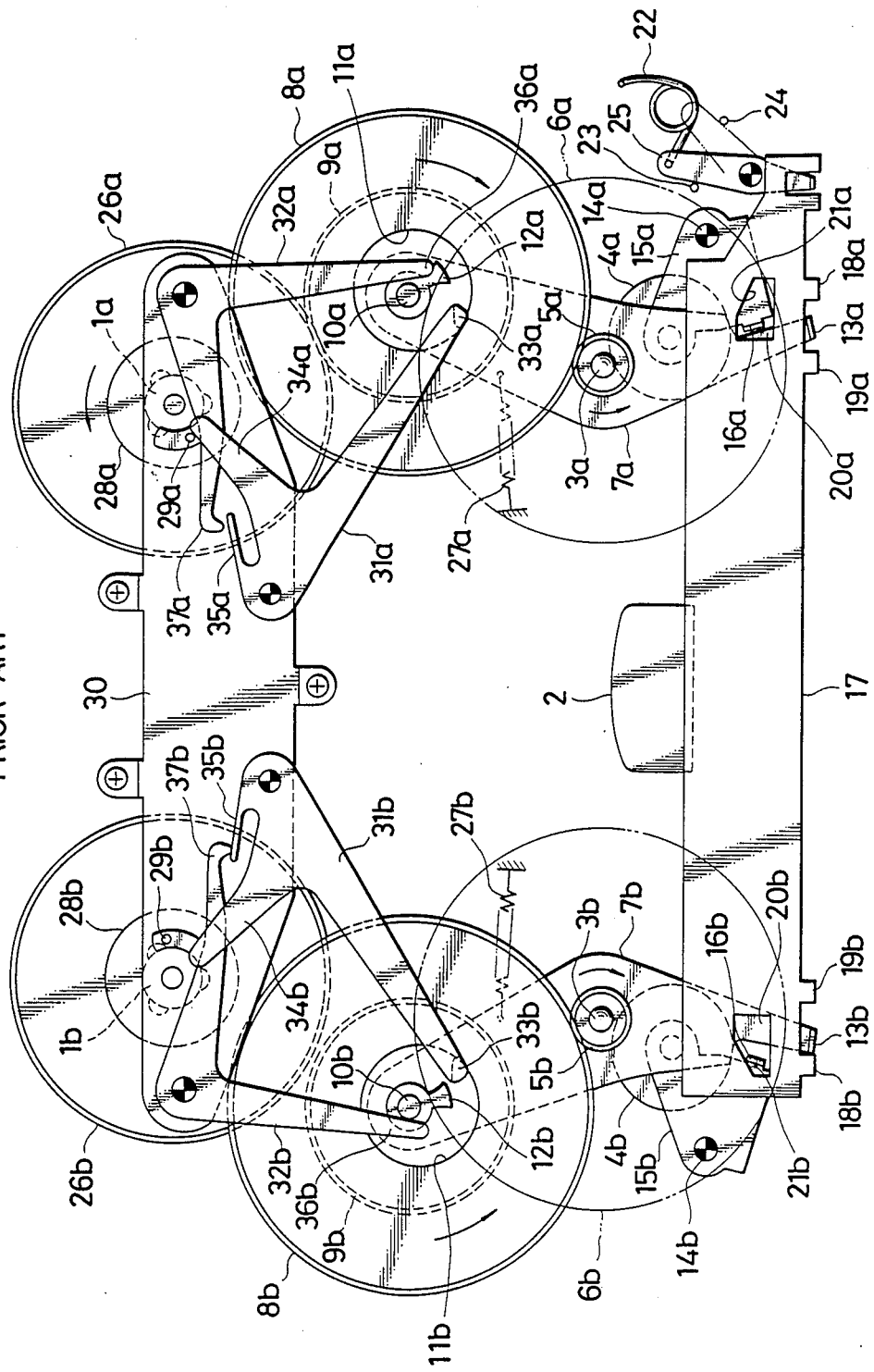
FIG. 4 is a schematic top plan view of a conventional automatic reverse mechanism for a tape recorder.
Figure 5:
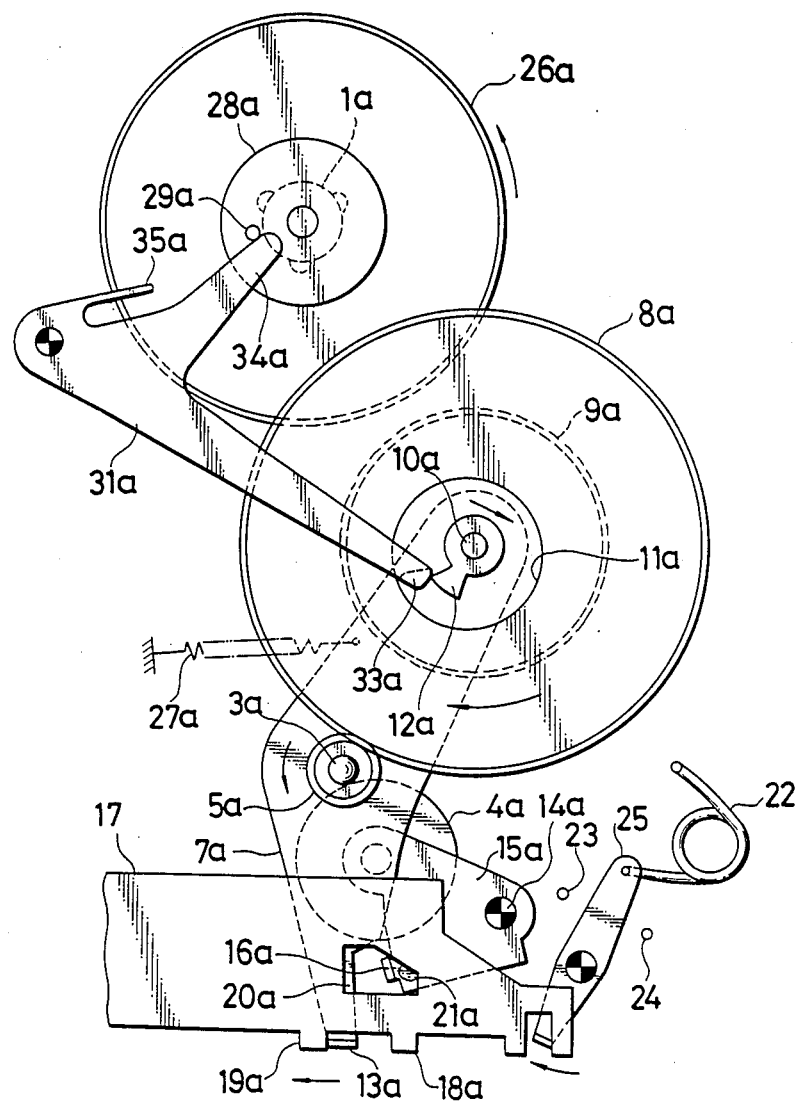
FIG. 5 is a fragmentary schematic top plan view of the conventional automatic reverse mechanism of FIG. 4.

In FIGS. 1 and 2, the following elements of structures are substantially the same as their corresponding elements of structure in FIGS. 4 and 5: reel shafts 1a,1b, magnetic head 2, capstans 3a,3b, pinch rollers 4a,4b, small diameter gears 5a,5b, flywheels 6a,6b, turnable members 7a,7b, large and small diameter gears combined in a pair 8a,9a;8b,9b (rotation transmitting units), shafts 10a,10b, brackets 15a,15b, bent edge portions 16a,16b, changeover bar 17, lugs 18a,18b;19a,19b, openings 20a,20b, tilted edges 21a,21b, toggle spring 22, stopper pins 23,24, two-state switch lever 25, gears 26a,26b, tension springs 27a,27b and fixing plate 30. However, the turnable members 7a,7b are different from their corresponding members in FIGS. 4 and 5. As shown in FIGS. 1 and 2, one ends, namely, the upper ends 46a,46b of the turnable members 7a,7b extend in a direction opposite to the other ends, namely, the bent end portions 13a,13b from the positions where the gears 8a,8b;9a,9b, which constitute the rotation transmitting units. Besides, the following differences exist between FIGS. 1 and 2 and FIGS. 4 and 5.

As substitutes for the eccentric circular cam surfaces 11a,11b in FIG. 4, eccentric circular cams 41a,41b are provided respectively about the shafts 10a,10b for the gears 8a,8b;9a,9b which constitute the rotation transmitting units. In addition, crescentic cams 42a,42b are also provided with their inwardly-arcuate surfaces opposing the peripheral surfaces of the corresponding eccentric circular cams 41a,41b.

On the other hand, the cam followers 43a,43b are provided in such a way that the rotations of the reel shafts 1a,1b are transmitted thereto via unillustrated friction mechanisms. The friction mechanisms may be of the same type as those employed in the conventional automatic reverse mechanism in FIGS. 4 and 5. The cam followers 43a,43b are provided respectively with sliding portions 44a,44b, which are maintained in sliding contact with either the peripheral surfaces of the corresponding eccentric circular cams 41a,41b or the outwardly-arcuate cam surfaces of the corresponding crescentic cams, engageable portions 47a,47b formed at positions opposite to the sliding portions 44a,44b, and arm portions 45a,45b engageable with the upper ends 46a,46b of the corresponding turnable members 7a,7b. Here, the arm portions 45a,45b are substitutes for the auxiliary holding members 32a,32b in FIGS. 4 and 5 and as shown in FIGS. 1 and 2, are formed into a thin shape so that the arm portions 45a,45b have spring-like properties. In addition, stopper pins 48a,48b are provided upright at fixed positions corresponding respectively to the engageable portions 47a,47b.

The operation of the mechanism according to the first embodiment of this invention will next be described. FIG. 1 shows that the right-hand pinch roller 4a is maintained in contact under pressure with the corresponding capstan 3a and the rotation of the capstan 3a, the direction of which is indicated by an arrow, is being transmitted to the right-hand reel shaft 1a via the gears 5a, 8a, 9a and 26a and the unillustrated friction mechanism. In this state, the rotary power of the reel shaft 1a is transmitted to the cam follower 43a via the unillustrated friction mechanism and the sliding portion 44a of the cam follower 43a is maintained in sliding contact with the peripheral surface of the eccentric circular cam 41a. As long as the sliding portion 44a remains in sliding contact with the peripheral surface of the eccentric circular cam 41a, the sliding portion 44a is not brought into sliding contact with the outwardly-arcuate cam surface of the crescent cam 42a so that the rotation transmitting route from the capstan 3a to the reel shaft 1a via the gears 5a, 8a, 9a and 26a and the unillustrated friction mechanism is maintained.

Let's now assume that a playback or recording operation is being performed while a magnetic tape (not illustrated) is taken up on the right-hand reel shaft 1a. Since the changeover bar 17 has been shifted rightward, the upper end 46b of the turnable member 7b presses the arm portion 45b of the cam follower 43b and by the pressing force of the upper end 46b, the sliding portion 44b of the cam follower 43b is brought into sliding contact with the peripheral surface of the eccentric circular cam 41b. Therefore, the sliding portion 44b is not brought into sliding contact with the outwardly-arcuate cam surface of the crescentic cam 42b so that the left-hand rotation transmitting unit (the gears 8b,9b) remains apart from the large diameter gear 26b, in other words, is maintained in a state moved to a non-engagement position relative to the reel shaft 1b.

When the magnetic tape has been fully taken up on the right-hand reel, slipping takes place in the friction mechanism interposed between the large diameter gear 26a and reel shaft 1a. Upon stopping of the reel shaft 1a, the sliding portion 44a of the cam follower 43a, said portion 44a having been maintained in sliding contact with the peripheral surface of the eccentric circular cam 41a, is brought to the maximum eccentric position of the cam 41a, namely, to the position farthest from the shaft 10a and remains standstill there. When the gears 8a,9a continue to rotate in the above-mentioned state, the sliding portion 44a is eventually brought into contact with the outwardly-arcuate cam surface of the crescentic cam 42a as depicted in FIG. 2. As a result, the cam follower 43a turns in the clockwise direction and upon engagement of the engageable portion 47a of the cam follower 43a with the stopper pin 48a, the turning movement of the cam follower 43a is stopped. The turnable member 7a then turns clockwise against the spring 27a to separate the gear 9a from the large gear 26a. As a consequence, the transmission of the rotary power from the gear 9a to the large gear 26a is cut off.

Thereafter, a reverse operation is performed in the same manner as in Examples 4 and 5. Namely, upon clockwise turning of the rotary member 7a, the bent end portion 13a of the turnable member 7a pushes the lug 19a of the changeover bar 17 from the right so that the changeover bar 17 is moved in the leftward direction. Concurrently with the leftward movement of the changeover bar 17, the two-state switch lever 25 turns clockwise while energizing the toggle spring 22. As soon as the energization of the toggle spring 22 exceeds its neutral point, the spring force of the spring 22 acts in such a direction that the two-state switch lever 25 is turned. As a result, the changeover bar 17 is rapidly moved leftward. At this time, the left-hand inclined edge 21b of the change-over bar 17 releases the bracket 15b. In contrast, the right-hand inclined edge 21a causes the bracket 15a to turn in a direction opposite to its biased direction. As a result, the left-hand pinch roller 4b is brought into contact under pressure with the capstan 3b and the right-hand pinch roller 4a is separated from the capstan 3a. Further, the left-hand turnable member 7b is pulled by the spring 27b and is hence caused to turn clockwise, whereby the small diameter gear 9b of the left-hand rotation transmitting unit is brought into meshing engagement with the corresponding large diameter gear 26b. In the above state, opposite to the state shown in FIG. 1, the left-hand reel shaft 1b is caused to rotate in the winding direction and a playback or recording operation is performed while the tape is being wound up on the left-hand reel.

Figure 3:
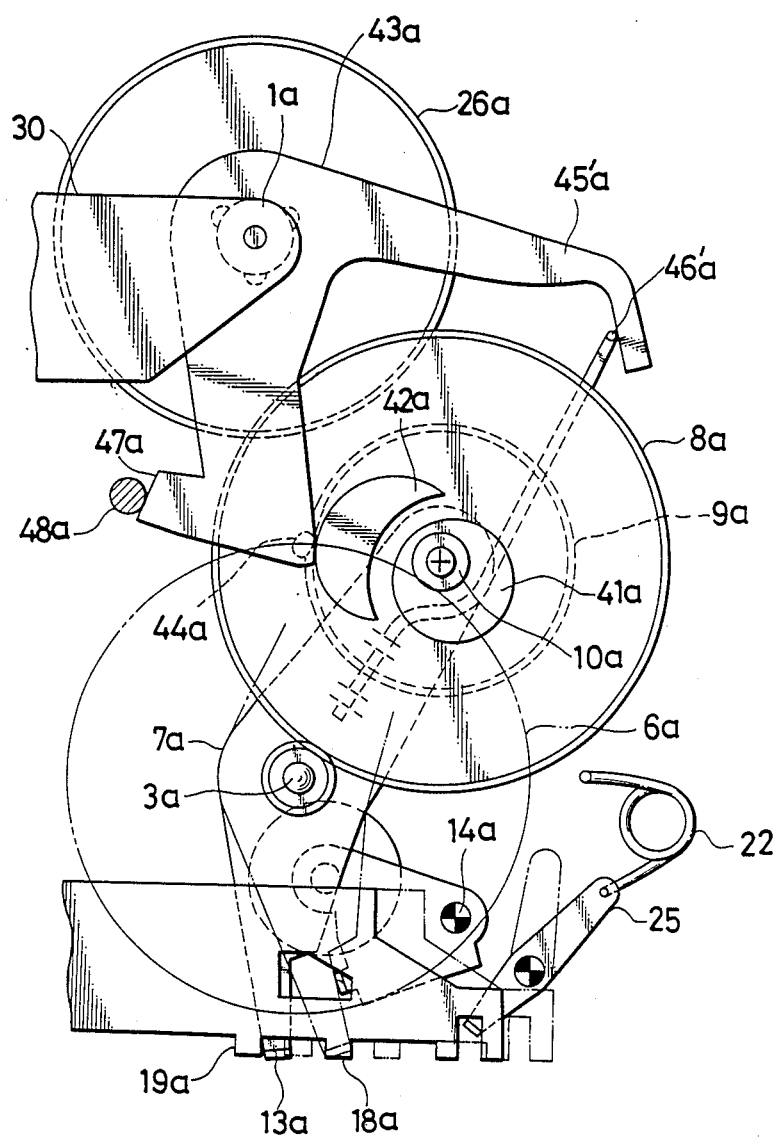
FIG. 3 is a fragmentary schematic top plan view of an automatic reverse mechanism according to another embodiment of this invention, which is suitable for use in a tape recorder.

Incidentally, the arm portions 45a,45b of the cam followers 43a,43b are provided with spring-like properties in the above embodiment. As shown in FIG. 3, it is however possible to form upper ends 46a+,46b' (46b' is not illustrated) of the turnable members 7a,7b (7b is not illustrated) into a thin shape so as to impart spring-like properties to the upper ends 46a',46b' without imparting spring-like properties to arm portions 45a',45b' (45b' is not illustrated) of the cam followers 43a,43b.

The automatic reverse mechanism of this invention, which is suitable for use in a tape recorder, can reduce the back tension to be applied to a magnetic tape. It is hence possible to stabilize the running speed of the magnetic tape. Owing to the requirement for fewer parts, it is possible to reduce the overall dimensions of the mechanism and also to increase the reliability of its operation.

Since accessories such as electromagnetic plungers are not required, the mechanism of this invention is suited for the reduction of the overall dimensions. The balanced rotation of flywheels is not adversely affected. Furthermore, the mechanism of this invention does not malfunction even if the tension of a magnetic tape increases temporarily at start, because the pinch roller changeover mechanism is actuated upon detection of stopping of reel shafts.

Having now fully described the invention, it will be apparent to one of ordinary skill in the art that many changes and modifications can be made thereto without departing from the spirit or scope of the invention as set forth herein.

I claim:

1. An automatic reverse mechanism for a tape recorder, in which a capstan, a pinch roller and reel shaft are arranged respectively on both sides of an associated magnetic head, the capstans on both sides of the magnetic head and either one of said reel shafts are normally driven and rotated, the pinch roller on the same side as the rotating reel shaft is pressed against the corresponding capstan to cause the magnetic tape of a cassette inserted in the tape recorder to run toward the rotating reel shaft, and when the magnetic tape has been fully wound up on the rotating reel shaft, the running direction of the magnetictape is automatically changed over, said automatic reverse mechanism comprising:

rotation transmitting member shaving shafts and arranged symmetrically relative to the magnetic head, said rotation transmitting members being normally rotated about their corresponding shafts under rotary powers of the corresponding capstans so as to transmit the rotary powers to the corresponding reel shafts via corresponding friction mechanisms;

eccentric peripheral circular cam surfaces provided respectively about the shafts of the rotation transmitting members;

cam members having outwardly-arcuate cam surfaces and provided respectively on the rotation transmitting members with an interval between the cam members and the eccentric circular cam surfaces, said outwardly-arcuate cam surfaces being located on the sides opposite to the peripheral surfaces of the corresponding eccentric circular cam surfaces;

cam followers arranged symmetrically relative to the magnetic head so as to receive the rotation of the corresponding reel shafts via said corresponding friction mechanisms; and a pinch roller changeover mechanism including turnable members provided symmetrically relative to the magnetic head and supporting the shafts of the corresponding rotation transmitting members thereon, and when one of the rotation transmitting members moves to its non-engagement position relative to its corresponding reel shaft, said pinch roller changeover mechanism changing over the respective pinch rollers to an on or an off state relative to their corresponding capstans in response to the movement of the rotation transmitting member; and each of said cam followers having a sliding portion slidable selectively against either the peripheral surface of the corresponding eccentric circular cam or the outwardly-arcuate cam surface of the corresponding cam member, an engageable portion formed at a position opposite to the sliding portion, and an arm portion engageable with one end of the corresponding turnable member; while the corresponding reel shaft is in rotation, said sliding portion being maintained in sliding contact with the peripheral surface of the corresponding eccentric circular cam so as to maintain the sliding portion apart from the outwardly-arcuate cam surface of the corresponding cam member; when the corresponding reel shaft has stopped and the sliding portion has come to the maximum eccentric position of the corresponding eccentric circular cam, the sliding portion being brought into sliding contact with the outwardly-arcuate cam surface of the corresponding cam member and the engageable portion being stopped, whereby the corresponding rotation transmitting member is moved to a non-engagement position relative to the associated reel shaft; and after the rotation transmitting member has moved to the non-engagement position relative to the corresponding reel shaft, said arm portion being brought into engagement with the one end of the corresponding turnable member so that the sliding member is maintained in its sliding state against the peripheral surface of the eccentric circular cam.

2. The automatic reverse mechanism as claimed in claim 1, wherein the cam members are crescentic cams.

3. The automatic reverse mechanism as claimed in claim 1, wherein the arm portions have spring-like properties.

4. The automatic reverse mechanism as claimed in claim 1, wherein an end portion of the turnable member, said end portion containing the one end of the turnable member, has spring-like properties.

* * * * *